(12) United States Patent
Ren et al.

(10) Patent No.: US 10,404,863 B2
(45) Date of Patent: Sep. 3, 2019

(54) BASE PHONE AND ADDITIONAL PHONE IMPLEMENTATION, ANSWERING, CALLING, AND INTERCOM METHOD, AND IP TERMINAL

(71) Applicant: Huawei Technologies Co., Ltd., Shenzhen (CN)

(72) Inventors: Qian Ren, Hangzhou (CN); Yijin Yang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 290 days.

(21) Appl. No.: 15/056,407

(22) Filed: Feb. 29, 2016

(65) Prior Publication Data
US 2016/0182731 A1    Jun. 23, 2016

Related U.S. Application Data

(63) Continuation of application No. PCT/CN2014/077338, filed on May 13, 2014.

(30) Foreign Application Priority Data

Aug. 28, 2013  (CN) .......................... 2013 1 0381988

(51) Int. Cl.
*H04M 1/725*    (2006.01)
*H04M 7/00*    (2006.01)
(Continued)

(52) U.S. Cl.
CPC ...... *H04M 7/0075* (2013.01); *H04L 65/1073* (2013.01); *H04M 1/2535* (2013.01);
(Continued)

(58) Field of Classification Search
CPC combination set(s) only.
See application file for complete search history.

(56) References Cited

U.S. PATENT DOCUMENTS 7,633,914 B2    12/2009  Shaffer et al.
2003/0235186 A1    12/2003  Park
(Continued)

FOREIGN PATENT DOCUMENTS

CN    1369172 A    9/2002
CN    2539358 Y    3/2003
(Continued)

OTHER PUBLICATIONS

Partial English Translation and Abstract of Japanese Patent Application No. JP2008187568, dated Aug. 14, 2008, 18 pages.
(Continued)

*Primary Examiner* — Derrick W Ferris
*Assistant Examiner* — The Hy Nguyen
(74) *Attorney, Agent, or Firm* — Conley Rose, P.C.

(57) ABSTRACT

A base phone and additional phone implementation method, and an Internet Protocol (IP) terminal. The implementation method includes acquiring, by the IP terminal, a group address, group-sending, by the IP terminal, a base phone query message according to the group address, and determining whether a base phone feedback message is received, and when the IP terminal receives the base phone feedback message fed back by a base phone, marking the IP terminal as an additional phone, and otherwise marking the IP terminal as a base phone, and registering with a server, and according to the implementation method the base phone and the additional phone are set up using IP terminals, which avoids disadvantages of a lack of security protection and proneness to theft when an analog phone is connected in a manner of physical parallel connection of copper cables, and therefore improves security significantly.

13 Claims, 5 Drawing Sheets

(51) Int. Cl.
  *H04M 1/253* (2006.01)
  *H04L 29/06* (2006.01)
  *H04M 3/42* (2006.01)
  *H04M 7/12* (2006.01)
(52) U.S. Cl.
  CPC .... *H04M 1/72505* (2013.01); *H04M 3/42263* (2013.01); *H04M 7/1205* (2013.01)

(56) References Cited

U.S. PATENT DOCUMENTS

| | | |
|---|---|---|
| 2004/0131053 A1 | 7/2004 | Sjolund et al. |
| 2004/0133641 A1* | 7/2004 | McKinnon ........ H04M 3/42365 709/204 |
| 2004/0179671 A1* | 9/2004 | Nonaka ................ H04M 3/523 379/265.02 |
| 2006/0135151 A1 | 6/2006 | Mu et al. |
| 2006/0218239 A1* | 9/2006 | Umezawa ............ G10H 1/0058 709/209 |
| 2006/0221857 A1 | 10/2006 | Bushnell et al. |
| 2007/0044141 A1 | 2/2007 | Lor et al. |
| 2007/0087769 A1* | 4/2007 | Takahashi ................ H04W 4/08 455/518 |
| 2007/0167157 A1 | 7/2007 | Hundal |
| 2008/0155689 A1 | 6/2008 | Denninghoff |
| 2008/0159303 A1* | 7/2008 | Deng ................ H04M 3/4931 370/401 |
| 2008/0281938 A1* | 11/2008 | Rai ...................... G06F 15/177 709/209 |
| 2008/0297585 A1 | 12/2008 | Chung et al. |
| 2010/0111282 A1* | 5/2010 | Fusco ............... H04L 29/06027 379/211.02 |
| 2011/0044322 A1* | 2/2011 | Deng .................. H04M 7/1205 370/352 |
| 2013/0303133 A1* | 11/2013 | Sansalone ........ H04M 1/72519 455/414.1 |
| 2014/0011542 A1 | 1/2014 | Hu et al. |

FOREIGN PATENT DOCUMENTS

| | | |
|---|---|---|
| CN | 101072208 A | 11/2007 |
| CN | 203104591 U | 7/2013 |
| EP | 1487149 B1 | 11/2009 |
| JP | 2000308128 A | 11/2000 |
| JP | 2000308182 A | 11/2000 |
| JP | 2008187568 A | 8/2008 |
| WO | 0111856 A1 | 2/2001 |

OTHER PUBLICATIONS

Foreign Communication From a Counterpart Application, PCT Application No. PCT/CN2014/077338, English Translation of International Search Report dated Sep. 17, 2014, 2 pages.

Foreign Communication From a Counterpart Application, PCT Application No. PCT/CN2014/077338, English Translation of Written Opinion dated Jun. 16, 2014, 6 pages.

Foreign Communication From a Counterpart Application, European Application No. 14839355.6, Extended European Search Report dated Aug. 5, 2016, 8 pages.

\* cited by examiner

BASE PHONE AND ADDITIONAL PHONE IMPLEMENTATION, ANSWERING, CALLING, AND INTERCOM METHOD, AND IP TERMINAL

CROSS-REFERENCE TO RELATED APPLICATIONS

This application is a continuation of International Application No. PCT/CN2014/077338, filed on May 13, 2014, which claims priority to Chinese Patent Application No. 201310381988.6, filed on Aug. 28, 2013, both of which are hereby incorporated by reference in their entireties.

TECHNICAL FIELD

The present disclosure relates to the field of communications technologies, and in particular, to a base phone and additional phone implementation, answering, calling, and intercom method, and an Internet Protocol (IP) terminal.

BACKGROUND

A traditional base phone and additional phone are often based on an analog phone deployed at home or in an enterprise, and functions of the traditional base phone and additional phone are supported in a physical parallel connection or wireless manner. Several phones in a set of base phone and additional phone share one operator number resource, and functions such as answering a call by any phone, making a call by any phone, and internal intercom, can be implemented.

An existing base phone and additional phone based on an analog phone generally have two connection modes. One is that all phone sets are connected using a physical line, and the other one is that the base phone is connected to a physical line and added with a wireless communications module in order to implement wireless connection between the base phone and the additional phone.

As mentioned above, the traditional base phone and additional phone are generally based on an analog phone. However, with the development of communications technologies, an analog phone is gradually replaced by an IP terminal, such as an IP telephone. In an evolution process of out with the copper, in with the fiber, that is, "narrowband+copper cable" is replaced with "broadband+optical fiber", the traditional analog phone and the base phone and additional phone based on an analog phone are facing a situation of being phased out as their disadvantages are becoming more obvious.

Disadvantages of the analog base phone and additional phone lie in that the base phone and additional phone based on an analog phone, in either of the foregoing modes, are connected in a manner of physical parallel connection of copper cables, which lacks security protection and is theft-prone. In addition, when one phone is in a call, a line is occupied, and another phone cannot initiate a new call.

SUMMARY

In view of this, the present disclosure is intended to provide a base phone and additional phone implementation, answering, calling, and intercom method, and an IP terminal in order to set up a base phone and an additional phone based on IP terminals, and implement basic functions, such as call answering, calling and intercom.

To achieve the foregoing objectives, the present disclosure has the following technical solutions.

According to a first aspect, the present disclosure provides a base phone and additional phone implementation method, where the method includes acquiring, by an IP terminal, a group address, group-sending, by the IP terminal and according to the group address, a base phone query message, and determining whether a base phone feedback message is received; and when the IP terminal receives the base phone feedback message fed back by a base phone, marking itself as an additional phone. Otherwise, marking, by the IP terminal, itself as a base phone, and registering with a server.

In a first possible implementation manner of the first aspect, the acquiring, by an IP terminal, a group address is acquiring, by the IP terminal, a multicast group address, where the group-sending is multicast, or acquiring, by the IP terminal, a terminal address list, where the group-sending is further sending a message to a terminal address in the terminal address list.

In a second possible implementation manner of the first aspect, when the IP terminal marks itself as a base phone, the method further includes, group-sending, by the IP terminal and according to a preset time period, a heartbeat message, and receiving a heartbeat feedback message that is fed back.

In a third possible implementation manner of the first aspect, when the IP terminal marks itself as an additional phone, the method further includes, receiving, by the IP terminal, a heartbeat message sent by the base phone, and if a time during which the IP terminal does not receive the heartbeat message exceeds a preset disconnection threshold, marking, by the IP terminal, itself as a base phone.

In a fourth possible implementation manner of the first aspect, when the group-sending is further multicast, the method further includes, when the IP terminal marks itself as a base phone, creating a phone list, and writing an address of the IP terminal into the phone list, or when the IP terminal marks itself as an additional phone, sending an address of the IP terminal to the base phone such that the address of the additional phone is written into a phone list by the base phone.

According to a second aspect, the present disclosure provides a base phone and additional phone answering method. After a base phone and an additional phone are set up according to the foregoing base phone and additional phone implementation method, and the base phone receives call-in information sent by a server, the method includes the following steps displaying, by the base phone, an incoming call, and group-sending a call-in message to the additional phone in a group such that the additional phone displays the incoming call, and when the base phone answers the incoming call, group-sending, by the base phone, a base phone answer message to inform the additional phone of the answer, and exchanging a media stream with a calling side, or when the additional phone answers the incoming call, receiving, by the base phone, an additional phone answer message group-sent by the additional phone in order to learn about an answer requirement of the additional phone, and base phone to exchange a media stream with a calling side.

In a first possible implementation manner of the second aspect, the exchanging, by the base phone, a media stream with a calling side is sending, by the base phone to the server, an answer instruction carrying a media transmission parameter of the base phone, establishing a communication session between the base phone and the calling side according to the media transmission parameter of the base phone, and exchanging the media stream.

In a second possible implementation manner of the second aspect, the enabling, by the base phone, the additional phone to exchange a media stream with a calling side is further, when the additional phone answer message carries a media transmission parameter of the additional phone, after the base phone receives the additional phone answer message, sending, to the server, an answer instruction carrying the media transmission parameter of the additional phone, and establishing a communication session between the additional phone and the calling side according to the media transmission parameter of the additional phone in order to enable the additional phone to exchange the media stream with the calling side, or when the additional phone answer message carries an address of the additional phone, after the base phone receives the additional phone answer message, sending, to the server, an answer instruction carrying a media transmission parameter of the base phone, establishing a communication session between the base phone and the calling side according to the media transmission parameter of the base phone, exchanging the media stream, and forwarding, by the base phone, the media stream to the additional phone according to the address of the additional phone.

According to a third aspect, the present disclosure provides a base phone and additional phone calling method. After a base phone and an additional phone are set up according to the foregoing base phone and additional phone implementation method, the method includes the following steps sending, by the base phone, a calling instruction to a server in order to enable the server to forward the calling instruction to a called side, where the calling instruction carries a called number, and when the called side answers the call, establishing a communication session between an IP terminal and the called side, and exchanging a media stream, where the IP terminal is the additional phone or the base phone.

In a first possible implementation manner of the third aspect, the sending, by the base phone, a calling instruction to a server is further sending, by the base phone, the calling instruction to the server according to a user operation, where the calling instruction further carries a media transmission parameter of the base phone, and the establishing a communication session between an IP terminal and the called side, and exchanging a media stream is further establishing, according to the media transmission parameter of the base phone, the communication session between the base phone and the called side, and exchanging the media stream.

In a second possible implementation manner of the third aspect, the method further includes group-sending, by the base phone, a base phone calling message to inform the additional phone of the call, where the base phone calling message carries the called number.

In a third possible implementation manner of the third aspect, the sending, by the base phone, a calling instruction to a server is, after the base phone receives an additional phone calling message group-sent by the additional phone, sending the calling instruction to the server, the establishing a communication session between an IP terminal and the called side, and exchanging a media stream is, if the additional phone calling message carries a media transmission parameter of the additional phone and the called number, the calling instruction further carries the media transmission parameter of the additional phone, and the establishing a communication session with the called side, and exchanging a media stream is, establishing the communication session between the additional phone and the called side according to the media transmission parameter of the additional phone, and exchanging the media stream, or if the additional phone calling message carries an address of the additional phone and the called number, the calling instruction further carries a media transmission parameter of the base phone, and the establishing a communication session with the called side, and exchanging a media stream is, establishing the communication session between the base phone and the called side according to the media transmission parameter of the base phone, exchanging the media stream, and forwarding, by the base phone, the media stream to the additional phone according to the address of the additional phone.

According to a fourth aspect, the present disclosure provides an IP terminal intercom method. After a base phone and an additional phone are set up according to the foregoing base phone and additional phone implementation method, the method includes the following steps sending, by a first IP terminal, an internal call message to a second IP terminal according to an address of the second IP terminal such that the second IP terminal displays an incoming call, and after the second IP terminal answers the call, establishing a communication session between the first IP terminal and the second IP terminal, and exchanging a media stream.

According to a fifth aspect, the present disclosure provides an IP terminal, where the IP terminal includes a group module configured to acquire a group address; a base phone and additional phone setting module configured to group-send a base phone query message according to the group address, and determine whether a base phone feedback message is received; and when the base phone feedback message fed back by a base phone is received, mark itself as an additional phone. Otherwise, mark itself as a base phone, and a registering module configured to, when the terminal is marked as a base phone, register with a server.

In a first possible implementation manner of the fifth aspect, the terminal further includes a heartbeat module configured to, when the terminal is marked as a base phone, group-send a heartbeat message according to a preset time period, and receive a heartbeat feedback message that is fed back; or when the terminal is marked as an additional phone, receive a heartbeat message and feed back a heartbeat feedback message.

In a second possible implementation manner of the fifth aspect, the base phone and additional phone setting module further includes a changing unit configured to, when the terminal is marked as an additional phone, and a time during which no heartbeat message is received exceeds a preset disconnection threshold, mark the terminal as a base phone marking, by the IP terminal, itself a base phone.

In a third possible implementation manner of the fifth aspect, the terminal answers an incoming call according to the method described in the second aspect.

In a fourth possible implementation manner of the fifth aspect, the terminal makes a call according to the method described in the third aspect.

In a fifth possible implementation manner of the fifth aspect, the terminal performs intercom according to the method described in the fourth aspect.

According a sixth aspect, the present disclosure provides a device, where the device includes a processor configured to acquire a group address, group-send a base phone query message according to the group address, and determine whether a base phone feedback message is received, and when the base phone feedback message fed back by a base phone is received, mark the device as an additional phone, otherwise, mark the device as a base phone, and a memory configured to store the group address.

From the foregoing technical solutions, it may be known that beneficial effects of the present disclosure are that a base phone and an additional phone are set up using IP terminals, which avoids disadvantages of a lack of security protection and proneness to theft when an analog phone is connected in a manner of physical parallel connection of copper cables, and therefore improves security significantly. In addition, the IP terminals perform communication in a group using a group-sending manner, which does not cause mutual interference, and ensures stable performance. Furthermore, three basic functions of answering, calling, and internal intercom implemented by the base phone and the additional phone are described such that the base phone and the additional phone can fully meet a use requirement.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
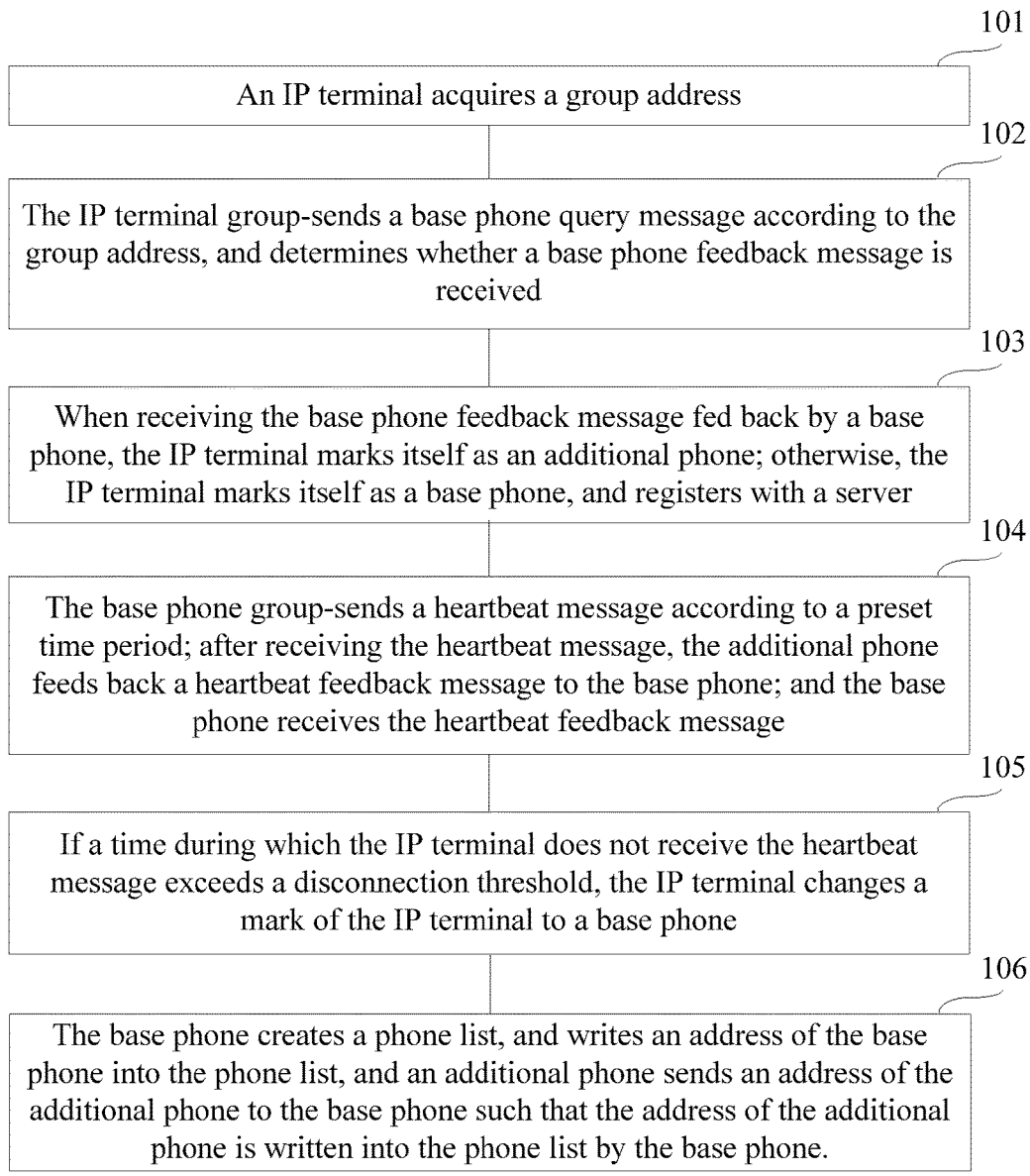
FIG. 1 is a flowchart of a base phone and additional phone implementation method according to an embodiment of the present disclosure.

FIG. 1 shows a specific embodiment of a base phone and additional phone implementation method according to the present disclosure. Different from a traditional base phone and additional phone based on an analog phone, in the embodiment, configuration of a base phone and an additional phone is implemented using IP terminals. Therefore, superiority of the IP terminals over the traditional analog phone can be reflected in the embodiment. The IP terminal may be an IP telephone, or another terminal loaded with a network IP communication software (such as a personal computer (PC) or a mobile phone). In the embodiment, the method further includes the following steps.

Step 101: The IP terminal acquires a group address.

According to the method of the embodiment, a relationship between a base phone and an additional phone is allocated to IP terminals such that the IP terminals can work coordinately according to the relationship between the base phone and the additional phone, and meet conditions of implementing functions, such as making and answering a call, performing internal intercom, and the like. The base phone and additional phone in the embodiment may include one base phone and at least one additional phone, where the base phone and the additional phone need to join a communication group. However, a base phone and an additional phone are relative concepts in a group. Before joining a group, an IP terminal is not differentiated as a base phone or an additional phone.

In the embodiment, the IP terminal achieves an effect of joining a communication group by acquiring the group address in order to facilitate subsequent relationship determining.

Step 102: The IP terminal group-sends a base phone query message according to the group address, and determines whether a base phone feedback message is received.

It should be noted that, the group-sending action of the IP terminal in the step is corresponding to the foregoing group, and only group-sending of the base phone query message is involved in the step, but from a view of extension, actions of group-sending all types of messages by the IP terminal involved in the present disclosure may comply with the following descriptions.

The group address includes a multicast group address or a terminal address list, that is, the group may be a multicast group, or may be a set of all terminals in a preset terminal address list. For the multicast group, joining the group means joining the multicast group, for the terminal address list, if an address of an IP terminal exists in the list and the IP terminal acquires the list, it means that the IP terminal joins the group. For the foregoing two manners, the group-sending actions are different.

For the multicast group, the group-sending means multicast, that is, sending a message to all other terminals in the multicast group. For the terminal address list, the group-sending means sending a message to addresses of all other terminals in the list. The foregoing two communication manners may be selected according to an actual requirement, and a difference in the communication manners does not affect other processes of an overall solution.

In addition, preferably, the embodiment may further include the following solution.

The IP terminal loads a preset encryption algorithm in the group; when group-sending a message, the IP terminal encrypts the group-sent message according to the encryption algorithm such that another terminal in the group decrypts the received group-sent message according to the encryption algorithm.

For the sake of security, a uniform encryption algorithm may be configured for an IP terminal that joins the group legally such that when group-sending a message, the IP terminal may use the encryption algorithm to encrypt the message to be sent. If another IP terminal that receives the encrypted message also loads the encryption algorithm, the other IP terminal may decrypt the encrypted message and perform a subsequent step. An IP terminal that does not load the uniform encryption algorithm is considered as a terminal that joins the group illegally. The IP terminal cannot decrypt the encrypted message or complete other corresponding procedures.

In the embodiment, after joining the group, the IP terminal first group-sends the base phone query message, that is, queries whether a base phone already exists in the current group. In the embodiment, a standard for determining a base phone is join group time, that is, an IP terminal that joins a group earliest is marked as a base phone. When an IP terminal is the first IP terminal to join a group, and no base phone exists in the group, the IP terminal will not receive a base phone feedback message after sending a base phone query message. On the contrary, if a base phone already exists in the group, the base phone query message group-sent by the IP terminal is received by the existing base phone, and the existing base phone feeds back a base phone feedback message to the IP terminal, in response to the base phone query message.

By determining whether a base phone feedback message is received, the IP terminal can learn about whether a base phone already exists in the current group.

Step 103: When receiving the base phone feedback message fed back by a base phone, the IP terminal marks itself as an additional phone, otherwise, the IP terminal marks itself as a base phone, and registers with a server.

According to the standard for determining a base phone and an additional phone, the first IP terminal that joins a group definitely receives no base phone feedback message, and therefore marks itself as a base phone. When another IP terminal joins the group and sends a base phone query message, the other IP terminal receives a base phone feedback message, and marks itself as an additional phone. Up to now, the relationship between the base phone and the additional phone is determined for IP terminals in the group.

In addition, before joining the group, an IP terminal in the group needs to carry server registration information. An IP terminal that is marked as a base phone further needs to register with the server using the server registration information in order to activate an IP telephone communication service. The server in the embodiment is a communications server that is used by an operator to provide a related service. When a user subscribes to a related service with the operator, the operator provides the user with a number (which is generally called a telephone number). When the number is used for the first time, the user needs to register and activate the number with the server in order to use the related service normally. The foregoing is a routine communication service subscription procedure, and details are not repeated herein. In the embodiment, the relationship between the base phone and the additional phone needs to be determined, the base phone completes registration, and the additional phone shares a same number with the base phone.

Because the registration is completed by the base phone, in the group including the additional phone and the base phone, a procedure of communicating with the server is completed by the base phone, which is a difference between the base phone and the additional phone.

By performing step 101 to step 103, the IP terminal obtains status of the additional phone or the base phone in the group, and the relationship between the base phone and the additional phone has been determined. However, in order to improve functions of the base phone and the additional phone, the embodiment further includes the following several preferred solutions. It should be noted that, because the following preferred solutions are based on a fact that status of the additional phone and the base phone has been determined, for ease of description, an IP terminal is no longer used uniformly to represent the additional phone or the base phone.

Step 104: The base phone group-sends a heartbeat message according to a preset time period. After receiving the heartbeat message, the additional phone feeds back a heartbeat feedback message to the base phone, and the base phone receives the heartbeat feedback message.

Step 105: If a time during which the IP terminal does not receive the heartbeat message exceeds a preset disconnection threshold, the IP terminal marks the IP terminal as a base phone.

To prevent a fault, the additional phone and the base phone further need to periodically learn, using a heartbeat message and a heartbeat feedback message, that the other party is running normally. By sending a heartbeat message according to a preset time period, the base phone starts a heartbeat procedure periodically. After receiving the heartbeat message, the additional phone learns that the base phone is running normally, and further feeds back a heartbeat feedback message in order to notify the base phone that the additional phone is also running normally.

If a time during which the additional phone does not receive the heartbeat message exceeds a preset disconnection threshold, it is considered that the base phone is already disconnected at this moment. To ensure normal running of the entire IP terminal group, a new base phone must be set. In the embodiment, an additional phone may be selected, the additional phone is marked as a base phone, and the additional phone registers with the server.

However, if there are multiple additional phones in the group, for details about which additional phone is further selected and marked as a base phone, reference may be made to the following two mechanisms.

One is to randomly select one of the multiple additional phones as the new base phone, which may be further that, by means of negotiation, each of all the additional phones generates a random number and group-sends the random number, and an additional phone whose random number is an extreme value (maximum or minimum) is finally selected and changed.

The other one is to pre-configure a priority order for all the IP terminals, where before joining the group, each IP terminal is configured with a same priority list. When the original base phone is disconnected, all the additional phones check the priority list, and definitely, an additional phone finds that its priority is the highest among all the existing additional phones, and the additional phone changes its status automatically.

Step 106: The base phone creates a phone list, and writes an address of the base phone into the phone list, and an additional phone sends an address of the additional phone to the base phone such that the address of the additional phone is written into the phone list by the base phone.

When a multicast manner is used in the method to perform internal communication, a phone list may further be created to support an intercom function between two parties and among multiple parties in the group. After writing addresses of all terminals in the multicast group into the phone list, the base phone further needs to send the phone list to all additional phones. That is, all the IP terminals in the multicast group can learn about an address of any other IP terminal according to the phone list. An IP terminal sends an internal call message to another terminal according to an address in the phone list in order to implement internal intercom.

For a group using a terminal address list for communication, the terminal address list functions as a phone list, and it is unnecessary to set a phone list again. A specific procedure of internal intercom in the group is disclosed in detail in the subsequent embodiments.

Corresponding to the method embodiment shown in FIG. 1, the present disclosure further discloses an IP terminal. For details, refer to FIG. 2. That is, using the IP terminal described in the embodiment, configuration of a base phone and an additional phone can be implemented according to the foregoing method, and a core technical solution of the terminal in the embodiment is consistent with the core technical solution of the foregoing method. The terminal further includes a group module 201 configured to acquire a group address, a base phone and additional phone setting module 202 configured to group-send a base phone query message according to the group address, and determine whether a base phone feedback message is received, and when the base phone feedback message fed back by a base phone is received, mark itself as an additional phone.

Otherwise, mark itself as a base phone, where the base phone and additional phone setting module further includes a changing unit configured to when the terminal is marked as an additional phone, and a time during which a heartbeat message is not received exceeds a preset disconnection threshold, mark the terminal as a base phone, a registering module 203 configured to, when the terminal is marked as a base phone, register with a server, and a heartbeat module 204 configured to, when the terminal is marked as a base phone, group-send a heartbeat message according to a preset time period, and receive a heartbeat feedback message that is fed back, or when the terminal is marked as an additional phone, receive a heartbeat message and feed back a heartbeat feedback message.

Figure 2:
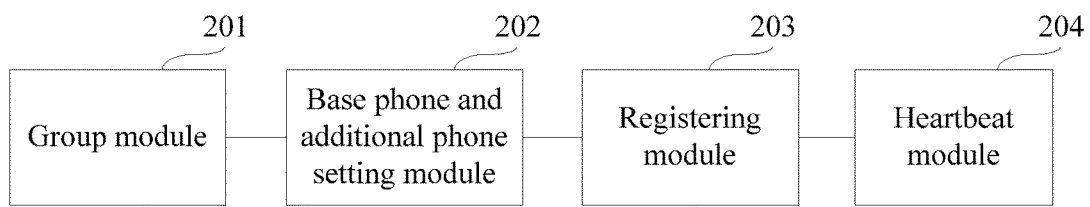
FIG. 2 is a schematic diagram of an IP terminal according to an embodiment of the present disclosure.

According to the technical solutions described in the two embodiments in FIG. 1 and FIG. 2, it can be known that beneficial effects of the method in the embodiment are as follows. IP terminals are used for setting up a base phone and an additional phone, which improves security significantly and avoids disadvantages of a lack of security protection and proneness to theft when analog phones are connected in a manner of physical parallel connection of copper cables. In addition, the IP terminals perform communication in a group in a multicast or list group-sending manner, which does not cause mutual interference, and ensures stable performance.

After the base phone and the additional phone are set up according to the foregoing embodiment, the base phone and the additional phone can communicate externally to implement answering and calling functions, and application functions such as internal intercom. The following discloses a specific procedure of implementing various application functions by the base phone and the additional phone. In the following several embodiments, implementation of all functions is based on a prerequisite of the base phone and additional phone that are set up according to the foregoing method, and the setup procedure of the base phone and additional phone is not repeated herein.

Figure 3:
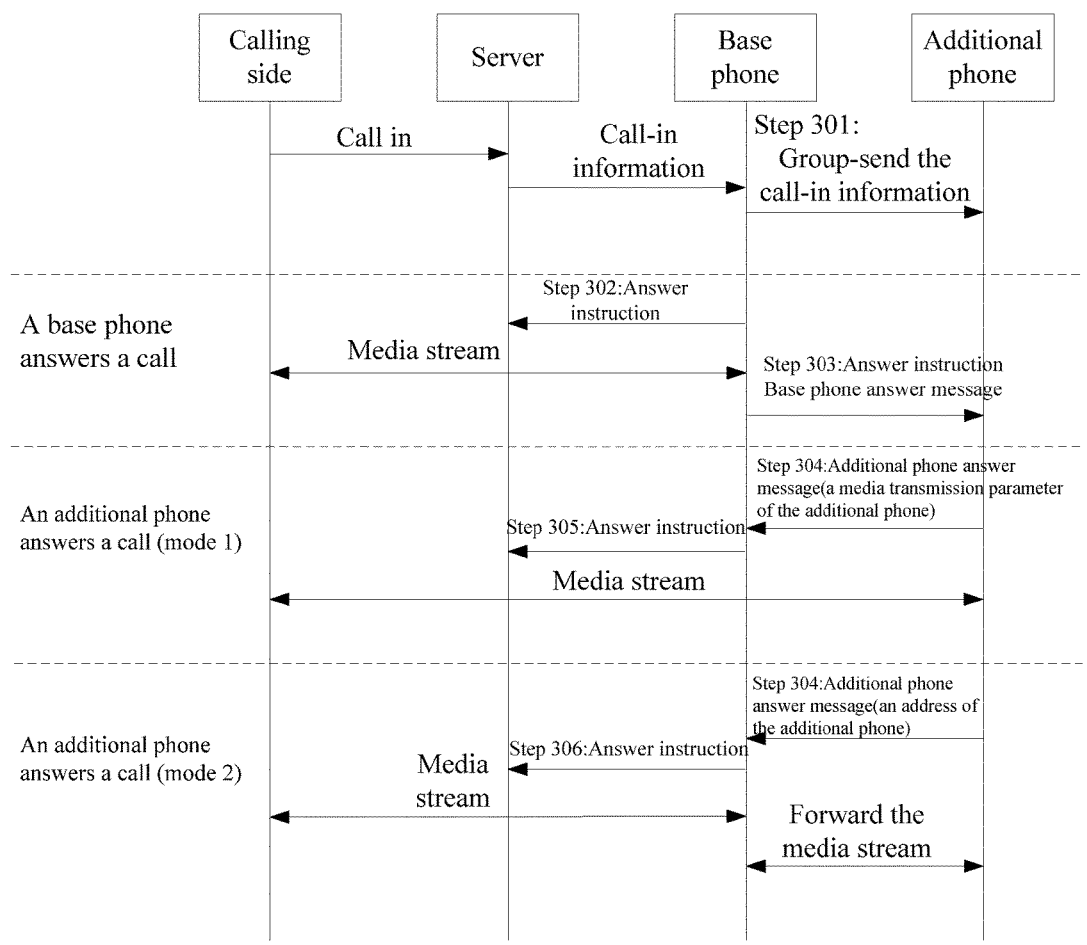
FIG. 3 is a flowchart of a base phone and additional phone answering method according to an embodiment of the present disclosure.

FIG. 3 shows a procedure in which a base phone and an additional phone answer an external incoming call. When the base phone and the additional phone have been set up, and an external calling side calls the base phone and the additional phone, the base phone receives call-in information sent by a server, where the call-in information generally carries a calling number. In the foregoing case, the answering method includes the following steps.

Step 301: The base phone displays an incoming call and group-sends a call-in message to the additional phone in a group such that the additional phone displays the incoming call.

The displaying an incoming call may be represented as phone ringing, and in normal cases, may also include displaying a calling number. In the embodiment, the call-in information already carries the calling number, and the base phone can display the number. Therefore, correspondingly, the call-in message also carries the calling number such that the additional phone can also display the number.

After the calling side makes a call, both the additional phone and the base phone display the incoming call, and can answer the incoming call. When the base phone answers the incoming call, step 302 is performed. When the additional phone answers the incoming call, step 304 is performed.

Step 302: The base phone sends, to the server, an answer instruction carrying a media transmission parameter of the base phone, establishes a communication session between the base phone and the calling side according to the media transmission parameter of the base phone, and exchanges a media stream.

The procedure in which the base phone directly answers the incoming call is basically consistent with a procedure in which a single IP terminal answers an incoming call, that is, the base phone directly establishes the communication session using the server, and exchanges the media stream with the calling side in the communication session to implement a call.

Step 303: The base phone group-sends a base phone answer message in order to inform the additional phone of the answer.

After answering the call, the base phone needs to group-send the base phone answer message to inform the additional phone in the group that the base phone already answers the incoming call. The additional phone may stop displaying the incoming call after receiving the base phone answer message.

Step 304: The additional phone group-sends an additional phone answer message.

In the embodiment, because the additional phone cannot directly interact with the server, when an additional phone needs to answer an incoming call, the additional phone needs to first group-send an additional phone answer message to, on one hand, inform the base phone such that the base phone learns about an answer requirement of the additional phone, and further responds to the server on behalf of the additional phone, and on the other hand, inform another additional phone that the additional phone already answers the incoming call, and the other additional phone may stop displaying the incoming call after receiving the additional phone answer message.

In the embodiment, the additional phone answer message may have two forms: further, the additional phone answer message may carry a media transmission parameter of the additional phone, or carry an address of the additional phone. Subsequent procedures for the forms are different. When the additional phone answer message carries the media transmission parameter of the additional phone, step 305 is performed. When the additional phone answer message carries the address of the additional phone, step 306 is performed.

Step 305: After receiving the additional phone answer message, the base phone sends, to the server, an answer instruction carrying a media transmission parameter of the additional phone, and establishes a communication session between the additional phone and the calling side according to the media transmission parameter of the additional phone in order to enable the additional phone to exchange a media stream with the calling side.

Because the base phone has received the media transmission parameter of the additional phone using the additional phone answer message, the base phone may directly establish the communication session between the additional phone and the calling side according to the media transmission parameter through the server, and the additional phone exchanges directly the media stream with the calling side using the communication session.

Step 306: When the additional phone answer message carries an address of the additional phone, after receiving the additional phone answer message, the base phone sends, to the server, an answer instruction carrying a media transmission parameter of the base phone, establishes a communication session between the base phone and the calling side according to the media transmission parameter of the base phone, and exchanges media stream, and the base phone forwards the media stream to the additional phone according to the address of the additional phone.

In the step, the base phone uses the server to establish the communication session between the base phone and the calling side according to the media transmission parameter of the base phone, and exchanges the media stream, and the procedure is consistent with step 302. Further, the base phone forwards the media stream to the additional phone according to the address of the additional phone in the additional phone answer message in order to indirectly implement media stream exchange between the additional phone and the calling side.

It should be noted that, the media stream here is actually a bi-directional media stream. On one hand, the base phone forwards, according to the address of the additional phone, a media stream flown from the calling side to the additional phone; and on the other hand, the base phone receives a media stream of the additional phone, and forwards the media stream to the calling side.

Step 305 and step 306 are two parallel additional phone answering manners, which may be further selected according to an actual requirement. An advantage of the method in step 305 is that the procedure is relatively simple and the base phone is not occupied. An advantage of the method in step 306 is that when another additional phone wants to join the session, the base phone needs only to forward the media stream to the other additional phone at the same time, which facilitates joining of another IP terminal and makes an answering manner more flexible.

In the embodiment, in order to support a caller identification (ID) display function, the call-in information, the base phone answer message, and the additional phone answer message carry the calling number.

In addition, in the embodiment and subsequent embodiments, involved media transmission parameters include content, such as an IP address and a port number that are used by a corresponding IP terminal (an additional phone or a base phone) to receive a media stream, and a supported media format. The media transmission parameter may be encapsulated in a session description protocol (SDP) format.

Figure 4:
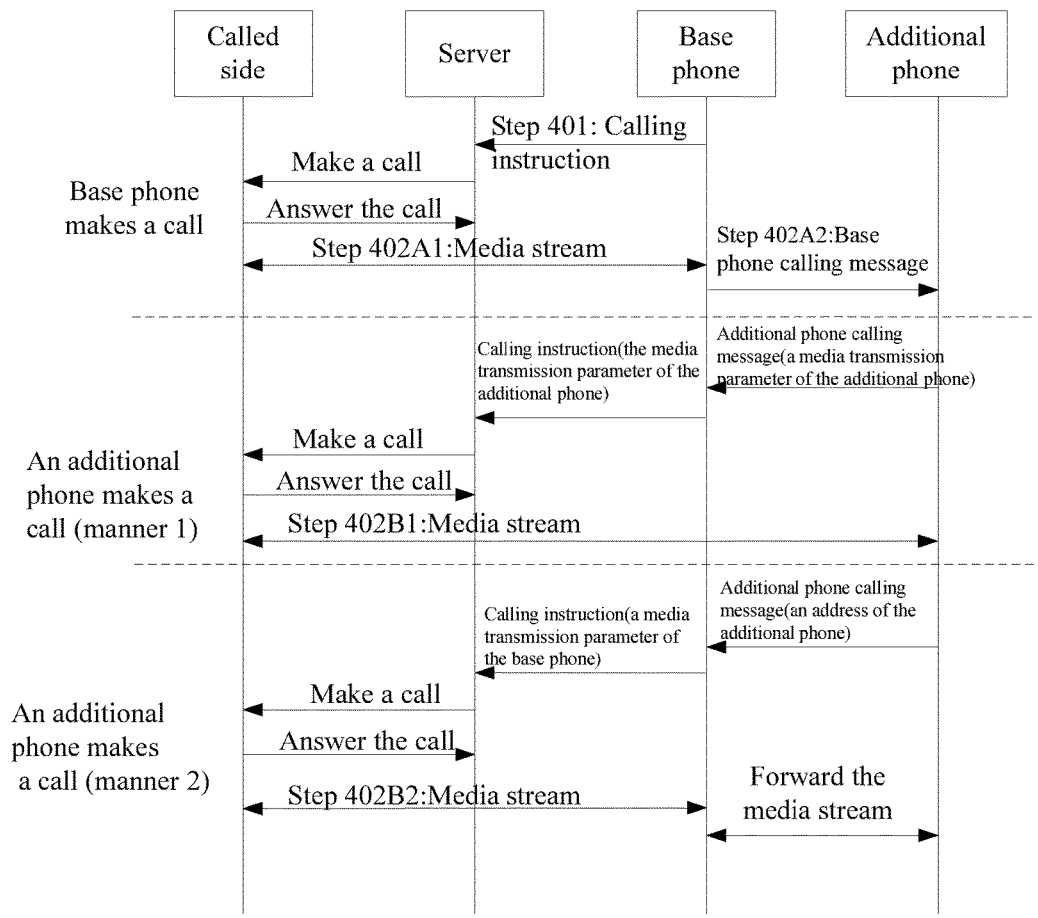
FIG. 4 is a flowchart of a base phone and additional phone calling method according to an embodiment of the present disclosure.

FIG. 4 is a procedure in which a base phone and an additional phone initiate an outgoing call. The calling procedure is rather similar to the foregoing answering procedure. When the base phone and the additional phone have been set up, and need to make a call to an external called side, a calling method includes the following steps.

Step 401: The base phone sends a calling instruction to a server such that the server forwards the calling instruction to the called side, where the calling instruction carries a called number.

According to the foregoing description, it is known that the base phone is the only IP terminal that is in a group and capable of interacting with the server; therefore, no matter whether the group wants to make an outgoing call using the additional phone or using the base phone, it is required that the base phone should finally send the calling instruction to the server. The calling instruction must carry the called number such that the server forwards the calling instruction to the called side according to the number in order to enable the called side to display the incoming call.

In the embodiment, that the base phone sends a calling instruction to a server also includes two cases: when the base phone is used to make the call, the base phone sends the calling instruction to the server according to a user operation; and when the additional phone is used to make the call, the additional phone must first group-send an additional phone calling message to, on one hand, inform the base phone so that the base phone learns about a calling requirement of the additional phone. On the other hand, inform another additional phone of the call. After receiving the additional phone calling message group-sent by the additional phone, the base phone sends the calling instruction to the server.

Step 402: When the called side answers the call, establish a communication session between an IP terminal and the called side, and exchange a media stream, where the IP terminal is the additional phone or the base phone.

In step 401, according to different status of the IP terminal that initiates the call, that the base phone sends a calling instruction includes two cases. Therefore, in the foregoing two cases, correspondingly, specific manners of establishing a communication session with the called side after the called side answers the call, and terminals corresponding to the communication session are different, which are respectively described below.

When a user directly uses the base phone to initiate the call, that is, the base phone sends the calling instruction to the server according to the user operation, a corresponding calling procedure is further as follows:

Step 402A1: When the base phone sends the calling instruction to the server according to the user operation, the calling instruction further carries a media transmission parameter of the base phone. Establish a communication session between the base phone and the called side according to the media transmission parameter of the base phone, and exchange the media stream.

In the step, the base phone may directly establish the communication session with the called side according to the media transmission parameter of the base phone, and exchange the media stream.

Step 402A2: The base phone group-sends a base phone calling message, where the base phone calling message carries the called number.

When the base phone initiates the call and communicates with the called side, the base phone may group-send the base phone calling message to inform the additional phone in the group of the communication.

When the additional phone initiates the call, the additional phone must first group-send an additional phone calling message to, on one hand, inform the base phone so that the base phone learns about the calling requirement of the additional phone, and sends a calling instruction to the server. On the other hand, inform another additional phone of the call.

A case in which the additional phone initiates the call is similar to the embodiment shown in FIG. 3. In the embodiment, that the additional phone performs communication also includes two manners. The additional phone directly participates in media stream exchange, and the base phone exchanges the media stream and forwards the media stream to the additional phone, which is further as follows.

Step 402B1: After receiving the additional phone calling message group-sent by the additional phone, the base phone sends the calling instruction to the server, where if the additional phone calling message carries a media transmission parameter of the additional phone and the called number, the calling instruction further carries the media transmission parameter of the additional phone, and the establishing a communication session with the called side, and exchanging a media stream is, establishing the communication session between the additional phone and the called side according to the media transmission parameter of the additional phone, and exchanging the media stream.

In the step, if the additional phone calling message directly carries the media transmission parameter of the additional phone, the communication session between the additional phone and the called side can be established according to the media transmission parameter of the additional phone such that the additional phone directly communicates with the called side, and exchanges the media stream.

Step 402B2; After receiving the additional phone calling message group-sent by the additional phone, the base phone sends the calling instruction to the server, where if the additional phone calling message carries an address of the additional phone and the called number, the calling instruction further carries a media transmission parameter of the base phone, and the establishing a communication session with the called side, and exchanging a media stream is, establishing the communication session between the base phone and the called side according to the media transmission parameter of the base phone, exchanging the media stream, and forwarding, by the base phone, the media stream to the additional phone according to the address of the additional phone.

It should be noted that, the media stream here is actually a bi-directional media stream. On one hand, the base phone forwards, according to the address of the additional phone, a media stream flown from the called side to the additional phone, and on the other hand, the base phone receives a media stream of the additional phone, and forwards the media stream to the called side.

In the step, the additional phone calling message carries the address of the additional phone; therefore, the communication session between the base phone and the called side needs to be established according to the media transmission parameter of the base phone, and the base phone forwards the media steam to the additional phone according to the address after exchanging the media steam.

Step 402B1 and step 402B2 are two parallel additional phone calling manners, which may be further selected according to an actual requirement. An advantage of the method in step 402B1 is that the procedure is relatively simple and the base phone is not occupied. An advantage of the method in step 402B2 is that when another additional phone wants to join the session, the base phone needs only to forward the media stream to the other additional phone at the same time, which facilitates joining of another IP terminal and makes an answering manner more flexible.

In addition, the base phone calling message, the additional phone calling message, and the calling instruction in the embodiment all carry the called number.

Figure 5:
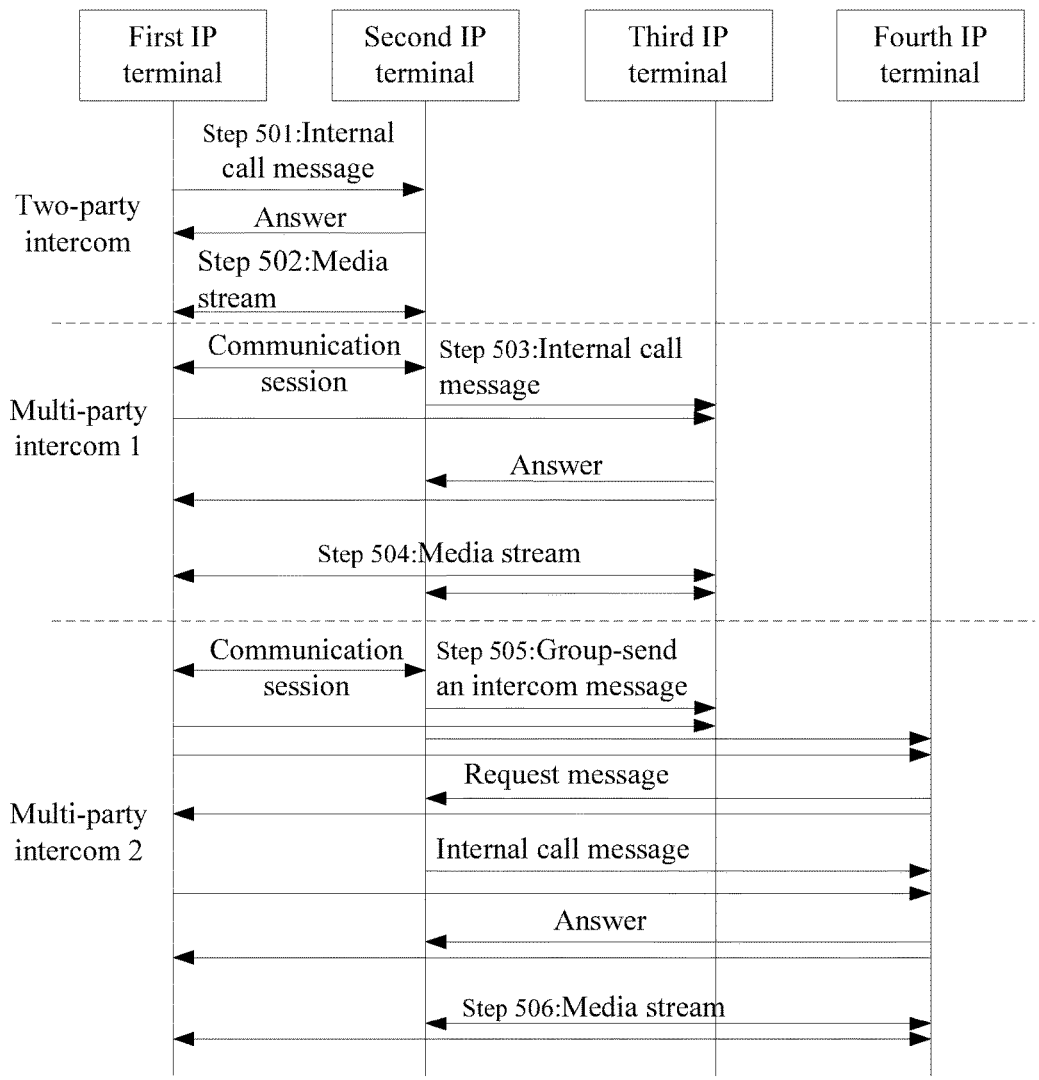
FIG. 5 is a flowchart of an IP terminal internal intercom method according to an embodiment of the present disclosure.

As shown in FIG. 5, the present disclosure further discloses an IP terminal intercom method. The intercom method is further implemented after a base phone and an additional phone are set up according to the method described in the embodiment shown in FIG. 1. However, a so-called status difference between the base phone and the additional phone is mainly reflected by a function of communicating and interacting with an external server. A procedure of internal two-party or multi-party intercom does not involve external communication. Therefore, the additional phone and the base phone are regarded completely equal without a difference in the internal communication procedure.

The intercom method in the embodiment is further as follows.

Step 501: A first IP terminal sends an internal call message to a second IP terminal according to an address of the second IP terminal such that the second IP terminal displays an incoming call.

Step 502: After the second IP terminal answers the call, the first IP terminal and the second IP terminal establish a communication session, and exchange a media stream.

In the intercom method, a terminal that initially initiates an internal call is the first IP terminal, and the first IP terminal directly sends the internal call message to a called IP terminal, namely, the second IP terminal in order to enable the second IP terminal to display the incoming call.

It needs to be noted that, because the terminals in the embodiment are all IP terminals, a difference from traditional analog phones is that in the embodiment, the internal call message must be sent according to the address such that the internal call message may reach a specified object, which means the internal call message is sent carrying the address of the second IP terminal.

The sending of the internal call message in the embodiment varies with different internal communication forms in the group. If internal communication is performed according to a terminal address list, the first IP terminal may directly find the address of the second IP terminal in the terminal address list, and send the internal call message to the address. If the group performs internal communication in a multicast manner, in order to implement targeted sending of the internal call message, a phone list must be created according to the foregoing step 106 such that the first IP terminal queries the address of the second IP terminal in the phone list, and sends the internal call message.

After the second IP terminal displays and answers the incoming call, the first IP terminal and the second IP terminal can establish the communication session, and exchange the media stream.

Step 501 and step 502 are a two-party intercom procedure of the IP terminals in the group, and based on this, multi-party intercom may further be implemented, namely, a conference call commonly known in the communications field. Establishment of multi-party intercom may be that a third party proactively requests to join the communication session between the first IP terminal and the second IP terminal, or may be that the first IP terminal or the second IP terminal invites a third party to join. Specific steps are as follows.

Step 503: After the first IP terminal and the second IP terminal establish the communication session and exchange the media stream, the first IP terminal or the second IP terminal directly sends an internal call message to a third IP terminal such that the third IP terminal displays an incoming call.

Step 504: After the third IP terminal answers the call and joins the communication session, the first IP terminal or the second IP terminal performs audio mixing, and the first IP terminal, the second IP terminal, and the third IP terminal exchange media streams.

After the first IP terminal and the second IP terminal establish the communication session, the two have a same permission and function, and both can initiate an invitation to the third party, and complete subsequent processing. The first IP terminal or the second IP terminal may invite the third IP terminal to join the session by directly sending the internal call message to the third IP terminal; after the third IP terminal receives the internal call message, displays and answers the incoming call, the third IP terminal joins the communication session. When the three exchange the media streams, the first IP terminal or the second IP terminal needs to perform audio mixing processing on the media streams of the call.

Step 505: After the first IP terminal and the second IP terminal establish the communication session and exchange the media stream, the first IP terminal or the second IP terminal group-sends an intercom message such that after receiving the intercom message, a fourth IP terminal sends a request message to request to join the communication session. After receiving the request message, the first IP terminal or the second IP terminal sends an internal call message to the fourth IP terminal such that the fourth IP terminal displays an incoming call.

Step 506: After the fourth IP terminal answers the call and joins the communication session, the first IP terminal or the second IP terminal performs audio mixing, and the first IP terminal, the second IP terminal, and the fourth IP terminal exchange media streams.

Step 505 and step 506 may occur concurrently with step 503 and step 504. After communication is established between the first IP terminal and the second IP terminal, an intercom message may be group-sent to inform another terminal in the group. When the fourth IP terminal in the group wants to join the communication session of the intercom, the fourth IP terminal can send the request message to the first IP terminal or the second IP terminal to request to join the communication session. If an IP terminal that receives the request message allows the fourth IP terminal to join, the IP terminal sends the internal call message to the fourth IP terminal.

The fourth IP terminal answers the call and joins the communication session, and the three may implement media stream exchange. A specific procedure is consistent with step 503.

In the embodiment, the method in step 503 to step 506 may also be used to enable multiple IP terminals to join the communication session concurrently or sequentially in order to implement internal intercom of more than three parties.

A beneficial effect achieved by the three embodiments shown in FIG. 3, FIG. 4, and FIG. 5 is that, based on implementation of configuring a base phone and an additional phone, the base phone and the additional phone can be further enabled to implement three basic functions of answering, calling, and internal intercom, which makes the overall technical solution of the base phone and the additional phone more complete and the disclosure clearer, thereby fully meeting a use requirement. It should be further emphasized that, the IP terminal in the embodiment shown in FIG. 2 implements the answering, calling, and internal intercom functions according to the methods in the foregoing three embodiments.

In addition, from a perspective of a hardware entity, the present disclosure further includes a device, where the device includes: a processor configured to acquire a group address, group-send a base phone query message according to the group address, and determine whether a base phone feedback message is received; and when the base phone feedback message fed back by a base phone is received, mark itself as an additional phone, otherwise, mark itself as a base phone; and a memory configured to store the group address.

The device is a physical device that is definitely required for implementing the foregoing IP terminal or the base phone and the additional phone.

Beneficial effects of the device in the embodiment are that, IP terminals are used for setting up a base phone and an additional phone, which improves security significantly, and avoids disadvantages of lack of security protection and proneness to theft when analog phones are connected in a manner of physical parallel connection of copper cables. In addition, the IP terminals perform communication in a group in a multicast or list group-sending manner, which does not cause mutual interference, and ensures stable performance.

It should be noted that, for all embodiments of the present disclosure, all involved addresses may be IP addresses.

Based on the foregoing descriptions of the implementation manners, a person skilled in the art may clearly understand that some or all steps of the methods in the embodiments may be implemented by software in addition to a necessary universal hardware platform. Based on such an understanding, the technical solutions of the present disclosure essentially or the part contributing to the prior art may be implemented in a form of a software product. The software product may be stored in a storage medium, such as a read-only memory (ROM)/random-access memory (RAM), a magnetic disk, or an optical disc, and includes several instructions for instructing a computer device (which may be a personal computer, a server, or a network device such as media gateway) to perform the methods described in the embodiments or some parts of the embodiments of the present disclosure.

It should be noted that the embodiments in this specification are all described in a progressive manner, for same or similar parts in the embodiments, reference may be made to these embodiments, and each embodiment focuses on a difference from other embodiments. Especially, device and system embodiments are basically similar to a method embodiment, and therefore are described briefly. For related parts, reference may be made to partial descriptions in the method embodiment. The described device and system embodiment is merely exemplary. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. A person of ordinary skill in the art may understand and implement the embodiments of the present disclosure without creative efforts.

The foregoing descriptions are merely exemplary embodiments of the present disclosure, but are not intended to limit the protection scope of the present disclosure. Any modification, equivalent replacement, or improvement made without departing from the spirit and principle of the present disclosure shall fall within the protection scope of the present disclosure.

What is claimed is:

1. A method, comprising:
    sending, by an Internet Protocol (IP) terminal to a group address, a base phone query message;
    marking, by the IP terminal, the IP terminal as a base phone when the IP terminal does not receive a base phone feedback message; and
    registering with a server when the IP terminal does not receive the base phone feedback message,
    wherein in response to the IP terminal being when the IP terminal is marked as the base phone, the method further comprises: comprising:
    receiving, by the IP terminal, call-in information from the server;
    displaying, by the IP terminal, an incoming call;
    group-sending, by the IP terminal, a call-in message to an additional phone in a group;
    group-sending, by the IP terminal, a base phone answer message to inform the additional phone of an answer of the incoming call when the IP terminal answers the incoming call, the IP terminal both answering the incoming call and group-sending the call-in message to the additional phone in the group for a same call; and
    exchanging a media stream with a calling side when the IP terminal answers the incoming call, and
    wherein the method further comprises:
    in response to the IP terminal receiving an additional group-sent phone calling message from the additional phone, the additional group-sent phone calling message carrying a media transmission parameter of the additional phone and a called number, performing the steps of:
        sending, by the IP terminal, a calling instruction to the server after the IP terminal receives the additional group-sent phone calling message from the additional phone, the additional group-sent phone calling message carrying a media transmission parameter of the additional phone and a called number, the calling instruction carrying the called number and the media transmission parameter of the additional phone;
        establishing a communication session between the additional phone and a called side according to the media transmission parameter of the additional phone; and
        exchanging a media stream over the established communication session when the called side answers the call, and in response to the IP terminal receiving an additional group-sent phone calling message from the additional phone, the additional group-sent phone calling message carrying an address of the additional phone and a called number, performing the steps of:
sending, by the IP terminal, a calling instruction to the server after the IP terminal receives the additional group-sent phone calling message from the additional phone, the calling instruction carrying the called number and a media transmission para meter of the IP terminal;
establishing a communication session between the IP terminal and the called side according to the media transmission parameter of the IP terminal;
exchanging a media stream over the established communication session when the called side answers the call; and
forwarding, by the IP terminal, the media stream to the additional phone according to the address of the additional phone.

2. The method of claim 1, wherein when the IP terminal is marked as the base phone, the method further comprises:
receiving, by the IP terminal, an additional phone answer message from the additional phone in order to learn about an answer requirement of the additional phone; and
enabling, by the IP terminal, the additional phone to exchange the media stream with the calling side.

3. The method of claim 2, wherein exchanging the media stream with the calling side comprises:
sending, by the IP terminal to the server, an answer instruction carrying a media transmission parameter of the IP terminal;
establishing a communication session between the IP terminal and the calling side according to the media transmission parameter of the IP terminal; and
exchanging the media stream.

4. The method of claim 2, wherein the additional phone answer message carries a media transmission parameter of the additional phone, and enabling, by the IP terminal, the additional phone to exchange the media stream with the calling side comprises:
sending, to the server, an answer instruction carrying the media transmission parameter of the additional phone; and
establishing a communication session between the additional phone and the calling side according to the media transmission parameter of the additional phone.

5. The method of claim 2, wherein the additional phone answer message carries an address of the additional phone, and enabling, by the IP terminal, the additional phone to exchange the media stream with the calling side comprises:
sending, to the server, an answer instruction carrying a media transmission parameter of the IP terminal;
establishing a communication session between the IP terminal and the calling side according to the media transmission parameter of the IP terminal;
exchanging the media stream; and
forwarding, by the IP terminal, the media stream to the additional phone according to the address of the additional phone.

6. The method of claim 1, wherein when the IP terminal is marked as the base phone, the method further comprises:
sending, by the IP terminal, a calling instruction to the server according to a user operation, the calling instruction carrying a called number and a media transmission parameter of the IP terminal;
establishing, according to the media transmission parameter of the IP terminal, a communication session between the IP terminal and a called side; and
exchanging a media stream when the called side answers the call.

7. The method of claim 6, further comprising group-sending, by the IP terminal, a base phone calling message to inform the additional phone of a call, the base phone calling message carrying the called number.

8. An Internet Protocol (IP) terminal, comprising:
a processor; and
a non-transitory computer readable medium coupled to the processor and comprising computer-executable instructions, the processor being configured to execute the computer-executable instructions to perform operations comprising:
sending, by an Internet Protocol (IP) terminal to a group address, a base phone query message;
marking the IP terminal as a base phone when the IP terminal does not receive a base phone feedback message; and
registering with a server when the IP terminal does not receive the base phone feedback message,
wherein in response to the IP terminal being when the IP terminal is marked as the base phone, the processor is further configured to execute the computer-executable instructions to perform further operations comprising:
receiving call-in information from the server;
displaying an incoming call;
group-sending a call-in message to an additional phone in a group;
group-sending a base phone answer message to inform the additional phone of an answer of the incoming call when the IP terminal answers the incoming call, the IP terminal both answering the incoming call and group-sending the call-in message to the additional phone in the group for a same call; and
exchanging a media stream with a calling side when the IP terminal answers the incoming call, and
wherein the operations further comprise:
in response to the IP terminal receiving an additional group-sent phone calling message from the additional phone, the additional group-sent phone calling message carrying a media transmission parameter of the additional phone and a called number, performing the steps of:
sending a calling instruction to the server after receiving an additional group-sent phone calling message from the additional phone, the additional group-sent phone calling message carrying a media transmission parameter of the additional phone and a called number, and the calling instruction further carrying the called number and the media transmission parameter of the additional phone;
establishing a communication session between the additional phone and a called side according to the media transmission parameter of the additional phone; and
exchanging a media stream over the established communication session when the called side answers the call, and
in response to the IP terminal receiving an additional group-sent phone calling message from the additional phone, the additional group-sent phone calling message carrying an address of the additional phone and a called number, performing the steps of:
sending a calling instruction to the server after the IP terminal receives the additional group-sent phone calling message from the additional phone, the calling instruction carrying the called number and a media transmission parameter of the IP terminal;
establishing a communication session between the IP terminal and the called side according to the media transmission parameter of the IP terminal;

exchanging a media stream over the established communication session when the called side answers the call; and forwarding the media stream to the additional phone according to the address of the additional phone.

9. The IP terminal of claim 8, wherein when the IP terminal is marked as the base phone, the processor is further configured to execute the computer-executable instructions to perform further operations comprising:

receiving an additional phone answer message from the additional phone in order to learn about an answer requirement of the additional phone; and enabling the additional phone to exchange the media stream with the calling side.

10. The IP terminal of claim 9, wherein exchanging the media stream with the calling side comprises:

sending to the server, an answer instruction carrying a media transmission parameter of the IP terminal;

establishing a communication session between the IP terminal and the calling side according to the media transmission parameter of the IP terminal; and exchanging the media stream.

11. The IP terminal of claim 9, wherein the additional phone answer message carries a media transmission parameter of the additional phone, and enabling the additional phone to exchange the media stream with a calling side comprising:

sending, to the server, an answer instruction carrying the media transmission parameter of the additional phone; and establishing a communication session between the additional phone and the calling side according to the media transmission parameter of the additional phone.

12. The IP terminal of claim 9, wherein the additional phone answer message carries an address of the additional phone, and enabling the additional phone to exchange the media stream with a calling side comprises:

sending, to the server, an answer instruction carrying a media transmission parameter of the IP terminal;

establishing a communication session between the IP terminal and the calling side according to the media transmission parameter of the IP terminal;

exchanging the media stream; and forwarding, by the IP terminal, the media stream to the additional phone according to the address of the additional phone.

13. The IP terminal of claim 8, wherein when the IP terminal is marked as the base phone, the processor is further configured to execute the computer-executable instructions to perform further operations comprising:

sending a calling instruction to the server according to a user operation, the calling instruction carrying a called number and a media transmission parameter of the IP terminal;

establishing, according to the media transmission parameter of the IP terminal, a communication session between the IP terminal and a called side; and exchanging a media stream when the called side answers the call.

* * * * *